US011307463B2

(12) United States Patent
Murata et al.

(10) Patent No.: US 11,307,463 B2
(45) Date of Patent: Apr. 19, 2022

(54) LIQUID CRYSTAL DISPLAY PANEL AND METHOD FOR MANUFACTURING THE SAME

(71) Applicant: SHARP KABUSHIKI KAISHA, Sakai (JP)

(72) Inventors: Koji Murata, Sakai (JP); Kiyoshi Minoura, Sakai (JP); Akira Sakai, Sakai (JP); Yuichi Kawahira, Sakai (JP); Kohzoh Nakamura, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 16/833,469

(22) Filed: Mar. 27, 2020

(65) Prior Publication Data
US 2020/0310201 A1 Oct. 1, 2020

Related U.S. Application Data

(60) Provisional application No. 62/826,565, filed on Mar. 29, 2019.

(51) Int. Cl.
*G02F 1/1337* (2006.01)
*G02F 1/1343* (2006.01)
*G02F 1/1362* (2006.01)

(52) U.S. Cl.
CPC ...... *G02F 1/133788* (2013.01); *G02F 1/1362* (2013.01); *G02F 1/134363* (2013.01); *G02F 1/134372* (2021.01); *G02F 1/136222* (2021.01)

(58) Field of Classification Search
CPC ......... G02F 1/133788; G02F 1/134363; G02F 1/133365; G02F 1/1334; G02F 1/1337;

(Continued)

(56) References Cited

U.S. PATENT DOCUMENTS

| 9,753,342 B2 | 9/2017 | Jin et al. |
| 2014/0139794 A1 | 5/2014 | Ohnishi et al. |
| 2017/0045765 A1* | 2/2017 | Fujisawa ............ C09K 19/2014 |

FOREIGN PATENT DOCUMENTS

| JP | 2003-057147 A | 2/2003 |
| JP | 2009-271390 A | 11/2009 |

(Continued)

OTHER PUBLICATIONS

English language translation of Japanese Patent Publication No. JP 2009271390; document downloaded from the European Patent Office at www.worldwide.espacenet.com on Dec. 11, 2020. Translation provided by translate tool on the website. (Year: 2009).*

*Primary Examiner* — Angela K Davison
(74) *Attorney, Agent, or Firm* — ScienBiziP, P.C.

(57) ABSTRACT

The liquid crystal display panel includes a first substrate, a second substrate, and a liquid crystal layer provided between the first substrate and the second substrate. The first substrate includes a first dielectric substrate, a first electrode and a second electrode provided on the first dielectric substrate and capable of generating a horizontal electric field in the liquid crystal layer, and a first alignment film being in contact with the liquid crystal layer. The second substrate includes a second dielectric substrate and a second alignment film provided on the second dielectric substrate and being in contact with the liquid crystal layer. The first alignment film has an azimuthal anchoring strength lower than the second alignment film. The liquid crystal layer includes a nematic liquid crystal material and a polymer network.

9 Claims, 2 Drawing Sheets

(58) Field of Classification Search
CPC ... G02F 1/133711; G02F 2001/134372; G02F 2001/136222; G02F 2001/13775; G02F 2001/13345; G02F 2001/133715; G02F 2001/133726; C09K 2019/546; C09K 2019/548

See application file for complete search history.

(56) References Cited

FOREIGN PATENT DOCUMENTS

| | | |
|---|---|---|
| JP | 2010-008597 A | 1/2010 |
| JP | 2014-215421 A | 11/2014 |
| WO | 2013/018668 A1 | 2/2013 |
| WO | 2015/122457 A1 | 8/2015 |

\* cited by examiner

LIQUID CRYSTAL DISPLAY PANEL AND METHOD FOR MANUFACTURING THE SAME

CROSS-REFERENCE TO RELATED APPLICATION

The present application claims priority to U.S. Provisional Application Ser. No. 62/826,565, filed Mar. 29, 2019, the content to which is hereby incorporated by reference into this application.

BACKGROUND OF THE INVENTION

1. Field of the Invention

The present disclosure relates to a liquid crystal display panel.

2. Description of the Related Art

Liquid crystal display panels using horizontal electric field modes such as an in-plane switching (IPS) mode and a fringe field switching (FFS) have an advantage that the visual dependence of γ (gamma) characteristics is low compared to known liquid crystal display panels using vertical electric field modes (e.g., VA mode). However, a further improvement in the display quality is required, in particular, improvements in response speed and display brightness are required.

As a method for improving the response speed, in particular, the falling speed (response speed when the voltage is turned off), for example, Japanese Unexamined Patent Application Publication No. 2009-271390 discloses a method in which the anchoring strength of an alignment film covering the electrode generating a horizontal electric field is set to be lower than the anchoring strength of an alignment film facing the alignment film with a liquid crystal layer therebetween.

In addition, International Publication No. WO 2015/122457 discloses a method for improving the falling speed by forming a polymer network in a liquid crystal layer through phase separation. The material constituting such a liquid crystal layer may be called a nano-phase separated (NPS) fast response liquid crystal material. Hereinafter, the material may be referred to as "NPSLC".

On the other hand, regarding the improvement in display brightness, for example, Japanese Unexamined Patent Application Publication No. 2010-8597 describes that the display brightness of a liquid crystal display panel of an FFS mode can be improved by using an N-type nematic liquid crystal material (the dielectric anisotropy is negative, $\Delta\varepsilon<0$).

SUMMARY OF THE INVENTION

It is an object of the present disclosure to provide a liquid crystal display panel having further improved response speed and display brightness and a method for manufacturing the panel.

According to embodiments of the present disclosure, the solution described in the following items is provided.

[Item 1]

A liquid crystal display panel including a first substrate, a second substrate, and a liquid crystal layer provided between the first substrate and the second substrate, wherein the first substrate includes a first dielectric substrate, a first electrode and a second electrode provided on the first dielectric substrate and capable of generating a horizontal electric field in the liquid crystal layer, and a first alignment film being in contact with the liquid crystal layer;

the second substrate includes a second dielectric substrate and a second alignment film provided on the second dielectric substrate and being in contact with the liquid crystal layer;

the first alignment film has an azimuthal anchoring strength lower than the second alignment film;

the liquid crystal layer includes a nematic liquid crystal material and a polymer network; and the polymer network anchors or does not anchor liquid crystal molecules in a first liquid crystal region that is in the liquid crystal layer and is adjacent to the first alignment film with an azimuthal anchoring strength lower than liquid crystal molecules in a second liquid crystal region that is in the liquid crystal layer and is adjacent to the second alignment film and anchors liquid crystal molecules in a third liquid crystal region that is between the first liquid crystal region and the second liquid crystal region with an azimuthal anchoring strength lower than the liquid crystal molecules in the second liquid crystal region and higher than the liquid crystal molecules in the first liquid crystal region.

[Item 2]

The liquid crystal display panel according to Item 1, wherein the azimuthal anchoring strength of the first alignment film is $1\times10^{-7}$ J/m² or more and $1\times10^{-5}$ J/m² or less.

[Item 3]

The liquid crystal display panel according to Item 1 or 2, wherein the azimuthal anchoring strength of the second alignment film is $1\times10^{-4}$ J/m² or more and $1\times10$ J/m² or less.

[Item 4]

The liquid crystal display panel according to any one of Items 1 to 3, wherein the polymer network has a higher density in the second liquid crystal region than in the first liquid crystal region.

[Item 5]

The liquid crystal display panel according to any one of Items 1 to 4, wherein the polymer network has a mass fraction of 1% or more and 3% or less for the entire liquid crystal layer.

[Item 6]

The liquid crystal display panel according to any one of Items 1 to 5, wherein the second liquid crystal region has a thickness of 5 nm or more and 500 nm or less.

[Item 7]

The liquid crystal display panel according to any one of Items 1 to 6, wherein the polymer network is not in contact with the first alignment film.

[Item 8]

The liquid crystal display panel according to any one of Items 1 to 7, wherein the first substrate includes a thin-film transistor being connected to either the first electrode or the second electrode and a color filter layer provided on the thin-film transistor; and the first electrode and the second electrode are provided on the color filter layer.

[Item 9]

The liquid crystal display panel according to any one of Items 1 to 8, the liquid crystal display panel being of an FFS mode. Specifically, the liquid crystal display panel according to any one of Items 1 to 8, wherein one of the first electrode and the second electrode is a conductive film provided with a plurality of slits, the other is a gapless conductive film not having a slit, and the electrodes face to each other with a dielectric layer therebetween.

[Item 10]

A method for manufacturing the liquid crystal display panel according to any one of Items 1 to 9, the method including:

a step (a) of preparing the first substrate and the second substrate;

a step (b) of preparing a liquid crystal composition material containing the nematic liquid crystal material and a photocurable resin;

a step (c) of forming a layer of the liquid crystal composition material between the first substrate and the second substrate; and a step (d) of forming the polymer network, after the step (c), by irradiating the liquid crystal composition material with light through the second substrate to cure the photocurable resin.

The nematic liquid crystal material may be a P-type liquid crystal material having positive dielectric anisotropy, or may be an N-type liquid crystal material having negative dielectric anisotropy.

The photocurable resin may be, for example, an ultraviolet curable resin including a (meth)acrylate monomer. The (meth)acrylate monomer includes a multifunctional monomer. The (meth)acrylate monomer preferably includes a monomer having mesogen. An initiator according to the wavelength of the ultraviolet light may be added.

According to one aspect of the present disclosure, liquid crystal display panels having further improved response speed and display brightness and a method for manufacturing such panels are provided.

DETAILED DESCRIPTION OF THE INVENTION

Liquid crystal display panels and a method for manufacturing them according to embodiments of the present disclosure will now be described with reference to the drawings. The embodiments of the present disclosure are not limited to those exemplified below.

Figure 1A:
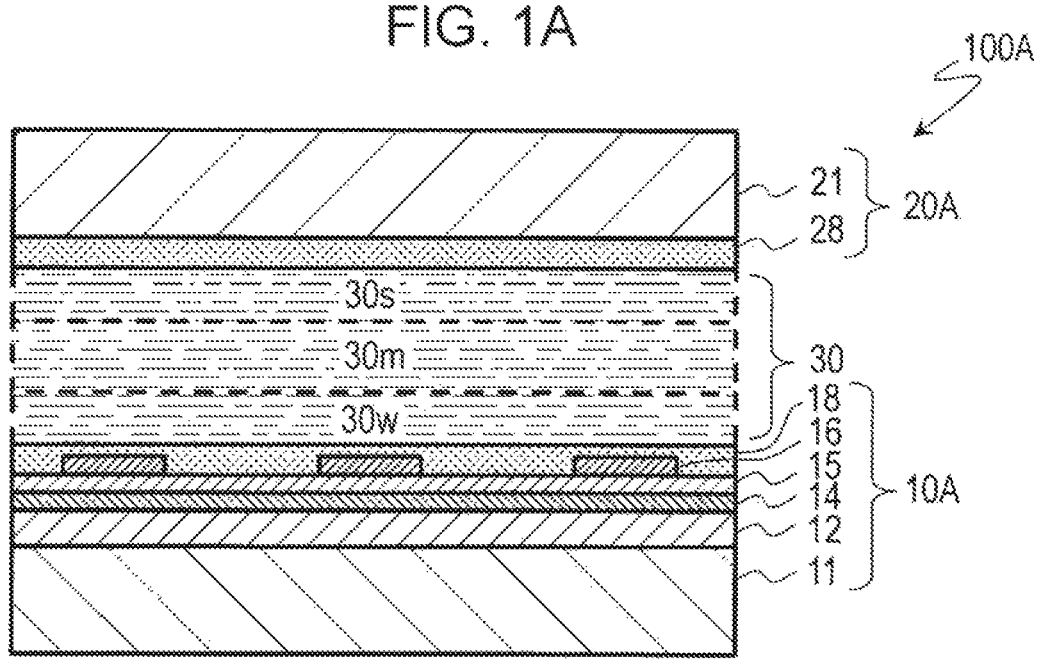
FIG. 1A is a schematic cross-sectional view of a portion corresponding to one pixel of a liquid crystal display panel 100A according to an embodiment of the present disclosure and is a cross-sectional view along the line 1A-1A' in FIG. 1B.
Figure 1B:
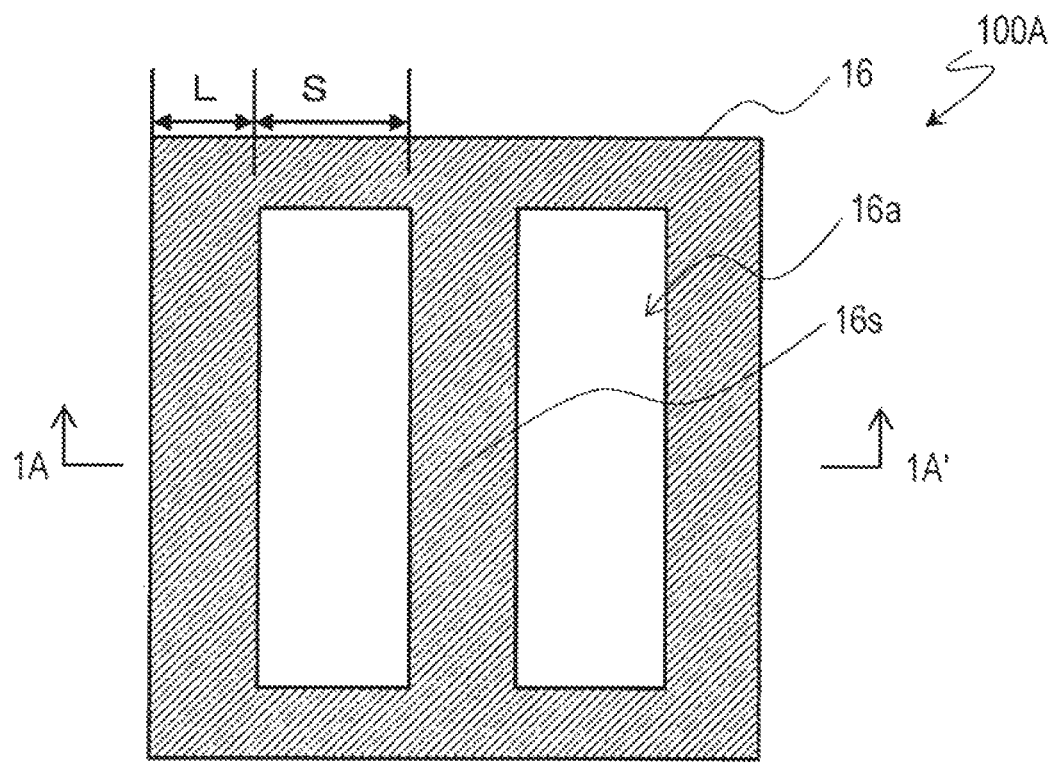
FIG. 1B is a schematic plan view of a portion corresponding to one pixel of the liquid crystal display panel 100A.

FIGS. 1A and 1B schematically illustrate the configuration of a liquid crystal display panel 100A according to an embodiment of the present disclosure. The liquid crystal display panel 100A includes a plurality of pixels arranged in a matrix with rows and columns. FIG. 1A is a schematic cross-sectional view of a portion corresponding to one pixel and is a cross-sectional view along the line 1A-1A' in FIG. 1B. FIG. 1B is a schematic plan view of a portion corresponding to one pixel of the liquid crystal display panel 100A.

The liquid crystal display panel 100A includes a TFT substrate (first substrate) 10A, an opposite substrate (second substrate) 20A, and a liquid crystal layer 30 provided between the TFT substrate 10A and the opposite substrate 20A.

The TFT substrate 10A includes a glass substrate (first dielectric substrate) 11, a first electrode 14 and a second electrode 16 that are provided on the glass substrate 11 and can generate a horizontal electric field in the liquid crystal layer 30, and a first alignment film 18 being in contact with the liquid crystal layer 30. The liquid crystal display panel 100A is a liquid crystal display panel of an FFS mode. Here, the second electrode 16 is a conductive film provided with a plurality of slits 16a, and the first electrode 14 is a gapless conductive film not having a slit and faces the second electrode 16 with a dielectric layer 15 therebetween. For example, the first electrode 14 is a common electrode, and the second electrode 16 is a pixel electrode. The second electrode 16 has a plurality of slits 16a and a plurality of straight sections 16s separated by the plurality of slits 16a. The straight sections 16s each have a width L of, for example, 0.5 μm or more and 6.0 μm or less, and the slits 16a each have a width S of, for example, greater than 1.0 and 10 μm or less. Here, for example, L=3.5 μm and S=4.5 μm. Incidentally, the number of the slits 16a is not limited to the example shown by the drawing, as long as there is at least one slit, and can be appropriately changed according to, for example, the dimension of the pixel.

The opposite substrate 20A includes a glass substrate (second dielectric substrate) 21 and a second alignment film 28 provided on the glass substrate 21 and being in contact with the liquid crystal layer 30.

Here, the first alignment film 18 has an azimuthal anchoring strength lower than the second alignment film 28. The liquid crystal layer 30 includes a nematic liquid crystal material and a polymer network (both are not shown). The polymer network anchors or does not anchor liquid crystal molecules in a first liquid crystal region 30w that is in the liquid crystal layer 30 and is adjacent to the first alignment film 18 with an azimuthal anchoring strength lower than liquid crystal molecules in a second liquid crystal region 30s that is in the liquid crystal layer 30 and is adjacent to the second alignment film 28 and anchors liquid crystal molecules in a third liquid crystal region 30m that is between the first liquid crystal region 30w and the second liquid crystal region 30s with an azimuthal anchoring strength lower than the liquid crystal molecules in the second liquid crystal region 30s and higher than the liquid crystal molecules in the first liquid crystal region 30w.

The force of an alignment film that regulates the alignment direction of liquid crystal molecules (director) is referred to as anchoring strength and is discriminated into polar anchoring strength acting on the rotation of liquid crystal molecules in the normal line direction of the substrate and azimuthal anchoring strength acting on the rotation of liquid crystal molecules in the in-plane direction of the substrate. In a liquid crystal display panel of a horizontal electric field mode, only the azimuthal anchoring strength needs to be considered. The azimuthal anchoring strength can be measured by, for example, the method described in Japanese Unexamined Patent Application Publication No. 2003-57147.

For example, the azimuthal anchoring strength of the first alignment film 18 is $1 \times 10^{-7}$ J/m$^2$ or more and $1 \times 10^{-5}$ J/m$^2$ or less. The first alignment film 18 is a weak-anchoring alignment film having a weak alignment-controlling force in the in-plane (in the horizontal surface) of the alignment film, such as a polymer brush or PMMA, or not having such a force. The first alignment film 18 can be formed, for example, using a polymer brush described in Japanese Unexamined Patent Application Publication No. 2014-215421. For reference, the entire disclosure content of the Japanese Unexamined Patent Application Publication No. 2014-215421 is incorporated herein by reference. On the other hand, the azimuthal anchoring strength of the second alignment film 28 is $1 \times 10^{-4}$ J/m$^2$ or more and $1 \times 10^{-3}$ J/m$^2$ or less. As the second alignment film 28, an alignment film that has been widely used, i.e., a photoalignment film (decomposition type, isomerization type, or dimerization type) or a rubbing alignment film, can be used. The second alignment film 28 can be formed by, for example, irradiating a photo-decomposition type photoalignment film with polarized ultraviolet light (e.g., 254 nm, 200 mJ).

The polymer network has a density in the second liquid crystal region 30s higher than in the first liquid crystal region 30w. For example, the mass fraction of the polymer network in the second liquid crystal region 30s is 3%, and the mass fraction of the polymer network in the first liquid crystal region 30w 0.001%. The mass fraction of the polymer network in the third liquid crystal region 30m is an intermediate value between the mass fraction of the polymer network in the second liquid crystal region 30s and the mass fraction of the polymer network in the first liquid crystal region 30w and is, for example, 1.5%.

The mass fraction of the polymer network is 1% or more and 3% or less for the entire liquid crystal layer, and the mass fractions of the polymer networks in the first liquid crystal region 30w, the second liquid crystal region 30s, and the third liquid crystal region 30m can respectively change according to the whole mass fraction. For example, the mass ratio (the ratio of mass fractions) of the polymer networks in the second liquid crystal region 30s, the third liquid crystal region 30m, and the first liquid crystal region 30w is, for example, preferably 1:about 0.5:about 0.00033 or less and further preferably 1 about 0.5 about 0.0001 to about 0.0002 (i.e., almost zero). The polymer network need not be in contact with the first alignment film 18. When the mass ratio of the polymer network in the first liquid crystal region 30w is about 0.0002 or less, the liquid crystal molecules on the electrode structure are not anchored and, as a result, the display brightness can be improved.

The thickness of the second liquid crystal region 30s is, for example, 5 nm or more and 500 nm or less. The thickness of the first liquid crystal region 30w is, for example, 0 nm or more and 500 nm or less. The thickness of the third liquid crystal region 30m is the thickness obtained by subtracting the thicknesses of the first liquid crystal region 30w and the second liquid crystal region 30s from the thickness of the liquid crystal layer. The polymer network is only required to form a concentration gradient in the liquid crystal layer so as to form the first liquid crystal region 30w, the second liquid crystal region 30s, and the third liquid crystal region 30m described above. The concentration gradient may be a continuous gradual change may a stepwise change.

In the liquid crystal display panel 100A, the liquid crystal layer includes a polymer network, and liquid crystal molecules are anchored at least in the second liquid crystal region and the third liquid crystal region as described above. Consequently, the falling response speed can be improved. In addition, since the first alignment film 18 provided on the electrode side generating a horizontal electric field is an alignment film having a weak anchoring strength, the liquid crystal molecules in the vicinity of the first alignment film 18 can easily change the alignment direction in response to the electric field to improve the response speed. Furthermore, as a result of the study by the present inventor, since the liquid crystal molecules in the vicinity of the first alignment film 18 and the liquid crystal molecules in the first liquid crystal region can easily change the alignment direction in response to the electric field by using an alignment film having a weak anchoring strength as the first alignment film 18 and controlling the polymer network not to anchor the liquid crystal molecules in the vicinity of the first alignment film 18 more strongly than necessary, the display brightness can be improved.

The liquid crystal display panel 100A is manufactured by, for example, as follows.

First, a TFT substrate 10A and an opposite substrate 20A are prepared. These substrates may be prepared by replacing the alignment films used in a known liquid crystal display panel of an FFS mode with those described above.

A liquid crystal composition material containing a nematic liquid crystal material and a photocurable resin for forming a liquid crystal layer 30 is prepared.

As the nematic liquid crystal material, a P-type liquid crystal material having positive dielectric anisotropy may be used, or an N-type liquid crystal material having negative dielectric anisotropy may be used. Here, for example, a P-type liquid crystal material is used.

The photocurable resin may be, for example, an ultraviolet curable resin including a (meth)acrylate monomer. The (meth)acrylate monomer includes a multifunctional monomer. The (meth)acrylate monomer preferably includes a monomer having mesogen. A polymer network having mesogen can tightly anchor liquid crystal molecules. An initiator according to the wavelength of the ultraviolet light may be added. In addition, a photocurable resin that cures by visible light can also be used by selecting an initiator.

The liquid crystal material and the photocurable resin used in an embodiment of the present disclosure are described in, for example, international Publication No. WO 2015/122457. For example, as the monomer having mesogen, V1-1-1 represented by the following [Chem 1] described in International Publication No. WO 2015/122457 can be used. For reference, the entire disclosure content of International Publication No. WO 2015/122457 is incorporated herein by reference.

[Chem. 1]

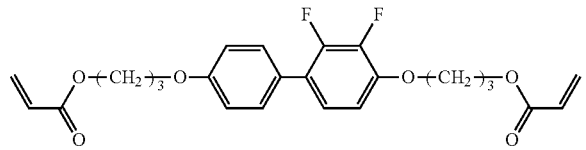

(V1-1-1)

The photocurable resin is mixed in an amount of, for example, 1 mass % or more and 3 mass % or less based on the total of the liquid crystal composition material including a nematic liquid crystal material and a photocurable resin.

Subsequently, a layer of the liquid crystal composition material is formed between the TFT substrate 10A and the opposite substrate 20A. This step may be performed by a vacuum injection method or may be performed by a dropping injection method.

Then, the photocurable resin is cured by irradiating the liquid crystal composition material with light through the opposite substrate 20A to form a polymer network. For example, ultraviolet light having a main wavelength of 313 nm and an intensity of 12 mW/cm² is irradiated at a light dose 1 to 10 J/cm². As necessary, ultraviolet light having a wavelength of 300 nm or less may be cut with a high pass filter and/or ultraviolet light having a wavelength of 327 nm or more may be cut with a low pass filter. Certainly, the wavelength of the ultraviolet light is appropriately selected according to the type, etc., of the photocurable resin.

Here, the reaction of the photocurable resin in the liquid crystal composition material proceeds faster near the opposite substrate 20A by irradiating light from the opposite substrate 20A side. Accordingly, a polymer network is formed with a relatively high density in the vicinity of the second alignment film 28. The reaction speed of the photocurable resin can be controlled by, for example, adjusting the intensity and the irradiation time of ultraviolet light to be irradiated, the temperature of the liquid crystal composition material, etc. Certainly, the reaction speed can also be controlled by the composition (the type and amount of the monomer) of the photocurable resin and the type and/or the amount of the initiator.

Incidentally, in most of color liquid crystal display panels, the opposite substrate includes a color filter layer. Accordingly, when a color liquid crystal display panel according to an embodiment of the present disclosure is manufactured, if an ultraviolet curable resin is used and ultraviolet light is irradiated from the opposite substrate side by the above-described procedure, the color filter layer absorbs most of the ultraviolet light, and the ultraviolet curable resin may not be cured effectively.

Figure 2:
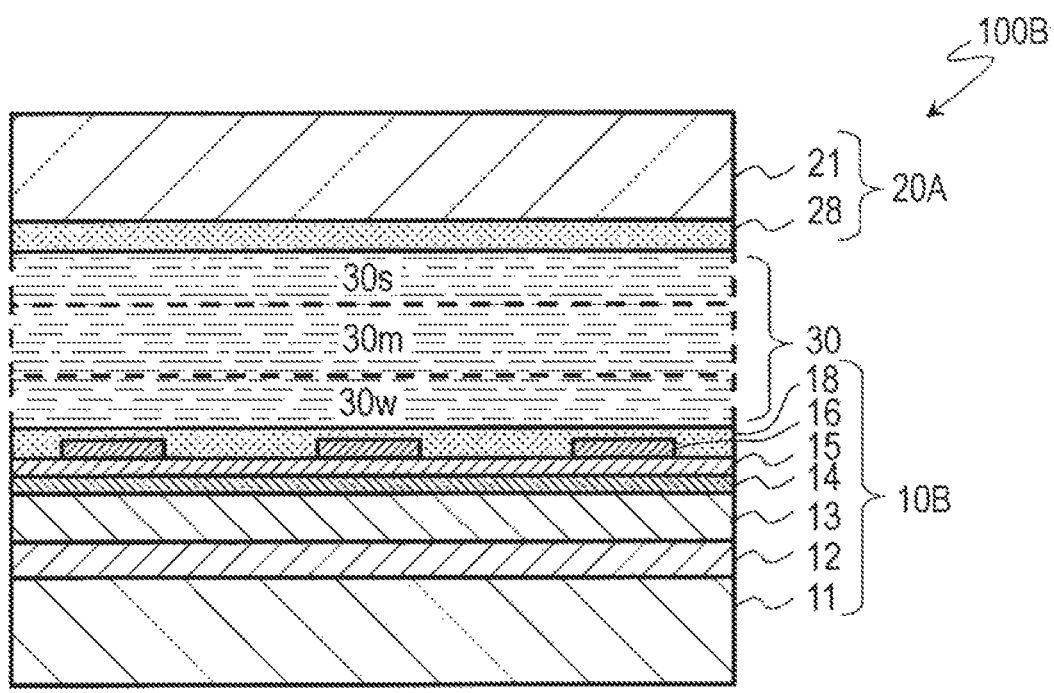
FIG. 2 is a schematic cross-sectional view of a portion corresponding to one pixel of a liquid crystal display panel 100B according to another embodiment of the present disclosure.

Accordingly, the color liquid crystal display panel according to an embodiment of the present disclosure is preferably provided with a color filter layer 13 in the TFT substrate 10B as in the liquid crystal display panel 100B shown in FIG. 2. The TFT substrate 10B includes an element layer 12 including a thin-film transistor connected to a second electrode 16 and a color filter layer 13 provided on the element layer 12, and a first electrode 14 and the second electrode 16 are provided on the color filter layer 13.

The liquid crystal display panel thus including a color filter layer on the TFT substrate is disclosed in, for example, U.S. Pat. No. 9,753,342. For reference, the entire disclosure content of U.S. Pat. No. 9,753,342 incorporated herein by reference.

An Example and Comparative Examples will now be shown.

Example 1

A liquid crystal cell that includes a first substrate including a color filter layer 13 and has the same configuration as that of the liquid crystal display panel 100B shown in FIG. 2 was produced. A pair of polarizing plates are arranged in crossed Nicols on both sides of the liquid crystal cell to form a cell of a normally black mode for evaluation. The electrode structure had the configuration shown in FIG. 1B having slits where L=3.5 μm and S=4.5 μm.

First alignment film (weak anchoring) on first substrate: PHMA brush described in Japanese Unexamined. Patent Application Publication No. 2014-215421 (formed by immersing a substrate in a polymer brush-forming solution prepared by dissolving hexyl methacrylate (radical polymerizable monomer, 0.101 mol), ethyl 2 bromoisobutyrate (polymerization initiator, 0.23 mmol), CuBr (copper halide, 0.67 mmol), and pentamethyl diethylene triamine (ligand compound, 0.96 mmol) in anisole and heating them at 90° C. for hours for living radical polymerization).

Second alignment film (strong anchoring) on second substrate: A photo decomposition type alignment film (thickness: about 100 nm, irradiation with 200 mJ/cm² of polarized ultraviolet light having a wavelength of 254 nm).

Nematic liquid crystal material: LCP-1 described in International Publication No. WO 2015/122457, dielectric anisotropy: positive, Δn: 0.103, viscosity: 20 mPa·s.

Photocurable resin: A polymerizable monomer V1-1-1, 3 mass % based on the total of the liquid crystal material and the photocurable resin (polymerization initiator: Irgacure 651, 2 mass % of the polymerizable monomer).

Thickness of liquid crystal layer (cell gap): 3.3 μm.

Incidentally, realignment treatment was performed by vacuum injection (about 1 Pa) of a liquid crystal composition material containing the nematic liquid crystal material, the photocurable resin (monomer), and the polymerization initiator and holding the material at a temperature not lower than the Tni point (about 100° C.) of the liquid crystal material for about 10 minutes.

Unpolarized ultraviolet light (wavelength: 313 nm, 5 mW/cm², 200 sec) was irradiated (1 J/cm²) through the second substrate.

Comparative Example 1

The same cell for evaluation as that in Example 1 was used.

The second alignment film (strong anchoring) was used as a pair of alignment films.

The same nematic liquid crystal material as that in Example 1 was used.

As the photocurable resin, a biphenyl-based bifunctional methacrylate monomer represented by the following chemical formula (1) described in International Publication No. WO 2013-018668 was used as the polymerizable monomer, and 0.1 mass (2 mass % based on the polymerizable monomer) of Irgacure 651 was mixed based on the total of the liquid crystal material and the photocurable resin.

[Chem. 2]

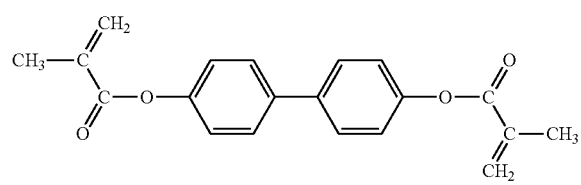

(1)

Unpolarized ultraviolet light (wavelength: 313 nm, 5 mW/cm², 200 sec) was irradiated (1 J/cm²) through the second substrate.

In Comparative Example 1, since the amount of the photocurable resin is small (low concentration), the amount of the generated polymer is low, and the polymer is present substantially only on the surface of the first alignment film and the surface of the second alignment film. The method for thus maintaining the alignment of liquid crystal molecules by the polymer formed on the surface of an alignment film is called polymer sustained alignment (PSA). In the PSA method, the polymer is present only on the surface of the alignment film (the interface between the alignment film and the liquid crystal layer) and is not present in the bulk of the liquid crystal layer. In addition, the amount of the polymer is little, and the polymer may be discretely present on the alignment film.

Comparative Example 2

A liquid crystal cell that, includes a first substrate not having a color filter layer and has the same configuration as that of the liquid crystal display panel 100A shown in FIG. 1A was produced. As in the cells for evaluation of Example 1 and Comparative Example 1, a pair of polarizing plates were arranged in crossed Nicols on both sides of the liquid crystal cell to form a cell of a normally black mode for evaluation.

Using the same first alignment film, second alignment film, nematic liquid crystal material, photocurable resin, and polymerization initiator as those in Example 1, at the end, unpolarized ultraviolet light (wavelength: 313 nm, 5 mW/cm$^2$, 200 sec) was irradiated (1 J/cm$^2$) through the first substrate.

That is, Comparative Example 2 was the same as Example 1 except that the first substrate did not include a color filter layer and that ultraviolet light irradiation for forming an NP LC was performed from the first substrate side unlike Example 1.

The results of evaluation of the response characteristics and brightness characteristics of the cells for evaluation of Example 1 and Comparative Examples 1 and 2 are shown in the following Table 1.

TABLE 1

|  | Comparative Example 1 | Comparative Example 2 | Example 1 |
|---|---|---|---|
| Photopolymerization UV light irradiation | PSA | NPSLC Irradiation from TFT substrate side | NPSLC Irradiation from opposite substrate side |
| Alignment film | Strong anchoring/ strong anchoring | Strong anchoring/ weak anchoring | Strong anchoring/ weak anchoring |
| Total response time (ms) ($\tau r + \tau d$) | 20 (9 + 11) | 20 (8 + 12) | 20 (9 + 11) |
| Mode efficiency (%) | 75 | 75 | 95 |
| Drive voltage (V) | 5 | 6 | 5 |

The total response time in Table 1 was measured using an LCD evaluation apparatus (LCD 5200 manufactured by Otsuka Electronics Co., Ltd.). When the voltage $V_{max}$ giving a relative transmittance of 100% (e.g., a rectangular pulse of an absolute value of 5 V) was applied to the liquid crystal layer of an evaluation cell at no voltage applied, the time required for increasing the relative transmittance from 10% to 90% was defined as $\tau r$ (ms). When the voltage applied to the liquid crystal layer of the evaluation cell was changed from $V_{max}$ to 0 V, the time necessary for reducing the relative transmittance from 90% to 10% was defined as $\tau d$ (ms).

The mode efficiency in Table 1 is defined as follows. The higher the mode efficiency, the higher the display brightness.

Mode efficiency (%)=((light transmittance of liquid crystal display panel)/(light transmittance when it is assumed that only a pair of polarizing plates are arranged in parallel Nicols))×100

Incidentally, the "light transmittance of liquid crystal display panel" in the expression above is standardized by the aperture ratio. In addition, the "x" in the expression above represents multiplication. The aperture ratio represents the ratio of the area actually contributing to display to the area of the display region of the liquid crystal display panel.

The drive voltage is the voltage (white display voltage) at which the relative transmittance becomes 100%. The transmittance of a normally-black liquid crystal display panel increases with an increase in applied voltage and tends to be saturated. The voltage value at which the transmittance is close to the saturation is defined as the white display voltage (drive voltage).

The total response time is 20 msec in all of Comparative Examples 1 and 2 and Example 1, and the values of $\tau r$ and $\tau d$ are approximately the same. That is, good response characteristics (response speeds) are provided in all of Comparative Examples 1 and 2 and Example 1.

On the other hand, the mode efficiency is low, 75%, in both Comparative Examples 1 and 2 but is very high, 95%, in only Example 1. The reason thereof is believed as follows.

In Comparative Example 1, both of a pair of alignment films are strong-anchoring alignment films, and the initial alignment of liquid crystal molecules is maintained by PSA. Consequently, the change in alignment of the liquid crystal molecules when a voltage is applied is restricted and it is believed that, as a result, the mode efficiency is low.

In Comparative Example 2, since the ultraviolet light irradiation for forming an NPSLC was performed from the TFT substrate side, the density of the formed polymer network is high on the TFT substrate side, i.e., on the electrode structure side. As a result, when a voltage is applied, the change in alignment of the liquid crystal molecules near the electrode structure is restricted, and it is believed that, consequently, the mode efficiency is low.

In contrast, in Example 1, since the ultraviolet light irradiation for forming an NPSLC was performed from the opposite substrate side, there is a density gradient that the density of the formed polymer network is high on the opposite substrate side, i.e., on the side far from the electrode structure and is low on the electrode structure side. Furthermore, the alignment film formed on the electrode structure has a low anchoring strength. Accordingly, since the change in alignment of the liquid crystal molecules near the electrode structure is not restricted when a voltage is applied, a high mode efficiency is provided. In addition, the falling response speed is improved by the strong-anchoring alignment film on the opposite substrate side and the polymer network.

As obvious from the above, according to the embodiments of the present disclosure, liquid crystal display panels having further improved response speed and display brightness and a method for manufacturing such panels are provided.

While there have been described what are at present considered to be certain embodiments of the invention, it will be understood that various modifications may be made thereto, and it is intended that the appended claim cover all such modifications as fall within the true spirit and scope of the invention.

What is claimed is:

1. A liquid crystal display panel comprising a first substrate, a second substrate, and a liquid crystal layer provided between the first substrate and the second substrate, wherein:

the first substrate includes a first dielectric substrate, a first electrode and a second electrode being provided on the first dielectric substrate, a first alignment film being in contact with the liquid crystal layer, a horizontal electric field being generated in the liquid crystal layer between the first electrode and the second electrode;

the second substrate includes a second dielectric substrate and a second alignment film provided on the second dielectric substrate, the second alignment film being in contact with the liquid crystal layer;

an azimuthal anchoring strength of the first alignment film is lower than an azimuthal anchoring strength of the second alignment film; and the liquid crystal layer includes a nematic liquid crystal material and a polymer network, wherein the polymer network anchors liquid crystal molecules in a first liquid crystal region in the liquid crystal layer, which is adjacent to the first alignment film, with an azimuthal anchoring strength that is lower than an azimuthal anchoring strength of liquid crystal molecules in a second liquid crystal region in the liquid crystal layer, the liquid crystal modules in a second liquid crystal region being adjacent to the second alignment film, the polymer network anchors liquid crystal molecules in a third liquid crystal region provided between the first liquid crystal region and the second liquid crystal region, with an azimuthal anchoring strength, which is lower than the azimuthal anchoring strength of the liquid crystal molecules in the second liquid crystal region and is higher than the azimuthal anchoring strength of the liquid crystal molecules in the first liquid crystal region, and the polymer network is not in contact with the first alignment film.

2. The liquid crystal display panel according to claim 1, wherein the azimuthal anchoring strength of the first alignment film is $1 \times 10^{-7}$ J/m$^2$ or more and $1 \times 10^{-5}$ J/m$^2$ or less.

3. The liquid crystal display panel according to claim 1, wherein the azimuthal anchoring strength of the second alignment film is $1 \times 10^{-4}$ J/m$^2$ or more and $1 \times 10^{-3}$ J/m$^2$ or less.

4. The liquid crystal display panel according to claim 1, wherein the polymer network has a higher density in the second liquid crystal region than in the first liquid crystal region.

5. The liquid crystal display panel according to claim 1, wherein the polymer network has a mass fraction of 1% or more and 3% or less for the entire liquid crystal layer.

6. The liquid crystal display panel according to claim 1, wherein the second liquid crystal region has a thickness of 5 nm or more and 500 nm or less.

7. The liquid crystal display panel according to claim 1, wherein:
the first substrate includes a thin-film transistor being connected to either the first electrode or the second electrode and a color filter layer provided on the thin-film transistor; and
the first electrode and the second electrode are provided on the color filter layer.

8. The liquid crystal display panel according to claim 1, the liquid crystal display panel comprising an FFS mode.

9. A method for manufacturing the liquid crystal display panel according to claim 1, the method comprising:
preparing the first substrate and the second substrate;
preparing a liquid crystal composition material containing the nematic liquid crystal material and a photocurable resin;
forming a layer of the liquid crystal composition material between the first substrate and the second substrate; and
forming the polymer network, after forming the layer of liquid crystal composition material, by irradiating the liquid crystal composition material with light through the second substrate to cure the photocurable resin.

* * * * *